US011843802B2

(12) United States Patent
Tian et al.

(10) Patent No.: US 11,843,802 B2
(45) Date of Patent: *Dec. 12, 2023

(54) METHODS OF INTRA PICTURE BLOCK PREDICTION FOR MULTI-VIEW VIDEO COMPRESSION

(71) Applicant: TENCENT AMERICA LLC, Palo Alto, CA (US)

(72) Inventors: Jun Tian, Palo Alto, CA (US); Shan Liu, Palo Alto, CA (US); Xiaozhong Xu, Palo Alto, CA (US); Weiwei Feng, Palo Alto, CA (US); Wen Gao, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/409,526

(22) Filed: Aug. 23, 2021

(65) Prior Publication Data
US 2022/0094979 A1    Mar. 24, 2022

Related U.S. Application Data

(63) Continuation of application No. 17/026,886, filed on Sep. 21, 2020, now Pat. No. 11,146,818.

(51) Int. Cl.
*H04N 19/597* (2014.01)
*H04N 19/176* (2014.01)
*H04N 19/159* (2014.01)
*H04N 19/105* (2014.01)
*H04N 19/167* (2014.01)

(52) U.S. Cl.
CPC ........ *H04N 19/597* (2014.11); *H04N 19/105* (2014.11); *H04N 19/159* (2014.11); *H04N 19/167* (2014.11); *H04N 19/176* (2014.11)

(58) Field of Classification Search
None
See application file for complete search history.

(56) References Cited

U.S. PATENT DOCUMENTS

2010/0157162 A1*  6/2010  Oshikiri ............... H04N 7/014
                                                            348/E5.062
2011/0004450 A1   2/2011  Tian et al.
2013/0265388 A1* 10/2013  Zhang ............... H04N 19/597
                                                            348/43

(Continued)

OTHER PUBLICATIONS

Chun-Chi Chen et al., "Screen Content Coding Using Non-Square Intra Block Copy for HEVC", 6pages.

(Continued)

*Primary Examiner* — Xiaolan Xu
(74) *Attorney, Agent, or Firm* — Sughrue Mion, PLLC

(57) ABSTRACT

A method, computer program, and computer system is provided for coding video data. Video data including a reference view and a current view is received. A co-located block in the reference view is identified for a current block in the current view. A predicted block vector is calculated based on an offset vector between the current block and the co-located block, and a disparity vector between the co-located block and the reference block in the reference view. The video data is encoded/decoded based on the calculated predicted block vector.

20 Claims, 6 Drawing Sheets

(56) References Cited

U.S. PATENT DOCUMENTS

2015/0382009 A1    12/2015    Chen
2016/0309186 A1    10/2016    Chen

OTHER PUBLICATIONS

Rajan Joshi et al., "Screen contact coding test model 1 (SCM 1)", Joint Collaborative Team on Video Coding (JCT-VC) of ITU-T SG 16 WP 3 and ISO/IEC JTC 1/SC 29/WG 11, Apr. 2014, 5 pages.

Benjamin Bross et al., "General Video Coding Technology in Responses to the Joint Call for Proposals on Video Compression with Capability beyond HEVC", IEEE Transactions On Circuites and Systems for Video Technology, 16pages.

Shan Liu et al., "Overview of HEVC extensions on screen content coding", SIP 2015, pp. 1-12, vol. 4.

Benjamin Bross et al., "Versatile Video Coding (Draft 2)", Joint Video Expers Team (JVET) of ITU-T SG 16 WP 3 and ISO/IEC JTC 1/SC 29/WG 11, Jul. 10-18, 2018, 139pages.

Rajan Joshi et al., "High Efficiency Video Coding (HEVC) Screen Contact Coding: Draft 4", Joint Collaborative Team on Video Coding (JCT-VC) of ITU-T SG 16 WP 3 and ISO/IEC JTC 1/SC 29/WG 11, Jun. 19-26, 2015, 661pages.

Xiaozhong Xu et al., "Intra block copy in Versatile Video Coding with Reference Sample Memory Reuse", 5pages.

Yingbin Wang et al., "Intra Block Copy in AVS3 Video Coding Standard", 6pages.

Xiaozhong Xu et al., "Improvements on Fast Motion Estimation Strategy for H.264/AVC", IEEE Transactions on Circuites and Systems for Video Technology, Mar. 2008, pp. 285-293, vol. 18, No. 3.

Xiaozhong Xu et al., "Fast Disparity Motion Estimation in MVC Based on Range Prediction", 4pages.

Xiaozhong Xu et al., "Block Vector Prediction in Intra Block Copy for HEVC Screen Content Coding", 2015 Data Compression Conference, 10pages.

International Search Report dated Jun. 29, 2021 in Application No. PCT/US2021/034470.

Written Opinion of the International Searching Authority dated Jun. 29, 2021 in Application No. PCT/US2021/034470.

Extended European Search Report dated Jun. 5, 2023 in Application No. 21869923.9.

Zhi-Pin Deng et al., "Fast Iterative Motion and Disparity Estimation Algorithm for Multiview Video Coding", 3DTV-Conference: the True Vision—Capture, Transmission and Display of 3D Video (3DTV-CON), IEEE, Jun. 7, 2010, (4 total pages).

Li Zhang et al., "Inter-view motion prediction in 3D-HEVC", 2014 IEEE International Symposium on Circuits and Systems (ISCAS), IEEE, Jun. 1, 2014, pp. 17-20 (4 total pages).

\* cited by examiner

METHODS OF INTRA PICTURE BLOCK PREDICTION FOR MULTI-VIEW VIDEO COMPRESSION

CROSS-REFERENCE TO RELATED APPLICATION

This application is a Continuation Application of U.S. application Ser. No. 17/026,886, filed on Sep. 21, 2020, in the United States Patent and Trademark Office, which is herein incorporated by reference in its entirety.

FIELD

This disclosure relates generally to field of data processing, and more particularly to video encoding and decoding.

BACKGROUND

Block based compensation from a different picture is well known as motion compensation. Similarly, a block compensation can also be done from a previously reconstructed area within the same picture. This is referred as intra picture block compensation, current picture referencing (CPR for short), or intra block copy (IBC). A displacement vector that indicates the offset between the current block and the reference block is referred as the block vector (or BV for short). Different from a motion vector in motion compensation, which can be at any value (positive or negative, at either x or y direction), a block vector has a few constraints such that it is ensured that the pointed reference block is available and already reconstructed. Also, in some codec design, such as in HEVC SCC, for parallel processing consideration, some reference area that is tile boundary or wavefront ladder shape boundary is also excluded. Other than the above constraints, the already reconstructed area of the same picture may be used as reference for intra block copy prediction purpose in HEVC SCC.

The coding of a block vector could be either explicit or implicit. In the explicit mode (or referred as AMVP mode in inter coding), the difference between a block vector and its predictor is signaled; in the implicit mode, the block vector is recovered purely from its predictor, in a similar way as a motion vector in merge mode. The resolution of a block vector, in some implementations, is restricted to integer positions; in other systems, it may be allowed to point to fractional positions.

The use of intra block copy at block level, can be signaled using a block level flag, referred as an intra block copy flag. In one embodiment, this flag is signaled when the current block is not coded in merge mode. Or it can be signaled by a reference index approach. This is done by treating the current decoded picture as a reference picture. In HEVC SCC, such a reference picture is put in the last position of the list. This special reference picture is also managed together with other temporal reference pictures in the DPB.

There are also some variations for intra block copy, such as treating the intra block copy as a third mode, which is different from either intra or inter prediction mode. By doing this, the block vector prediction in merge mode and AMVP mode are separated from regular inter mode. For example, a separate merge candidate list is defined for intra block copy mode, where all the entries in the list are all block vectors. Similarly, the block vector prediction list in intra block copy AMVP mode only consists of block vectors. The general rules applied to both lists are: they may follow the same logic as inter merge candidate list or AMVP predictor list in terms of candidate derivation process. For example, the 5 spatial neighboring locations in HEVC or VVC inter merge mode are accessed for intra block copy to derive its own merge candidate list.

Currently in VVC, the search range of intra block copy mode is constrained to be within the current coding tree unit. The effective memory requirement to store reference samples for intra block copy mode is 1 maximum coding tree unit size of samples. Considering the existing reference sample memory to store reconstructed samples in current 64×64 region, 3 more 64×64 sized reference sample memory are required. Based on this fact, the proposed method extends the effective search range of the intra block copy mode to some part of the left coding tree unit while the total memory requirement for storing reference pixels are kept unchanged (1 coding tree unit size, 4 64×64 reference sample memory in total).

SUMMARY

Embodiments relate to a method, system, and computer readable medium for coding video data. According to one aspect, a method for coding video data is provided. The method may include receiving video data including a reference view and a current view is received. A co-located block in the reference view is identified for a current block in the current view. A predicted block vector is calculated based on an offset vector between the current block and the co-located block, and a disparity vector between the co-located block and the reference block in the reference view. The video data is encoded/decoded based on the predicted block vector.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data including a reference view and a current view is received. A co-located block in the reference view is identified for a current block in the current view. A predicted block vector is calculated based on an offset vector between the current block and the co-located block, and a disparity vector between the co-located block and the reference block in the reference view. The video data is encoded/decoded based on the predicted block vector.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data including a reference view and a current view is received. A co-located block in the reference view is identified for a current block in the current view. A predicted block vector is calculated based on an offset vector between the current block and the co-located block, and a disparity vector between the co-located block and the reference block in the reference view. The video data is encoded/decoded based on the predicted block vector.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
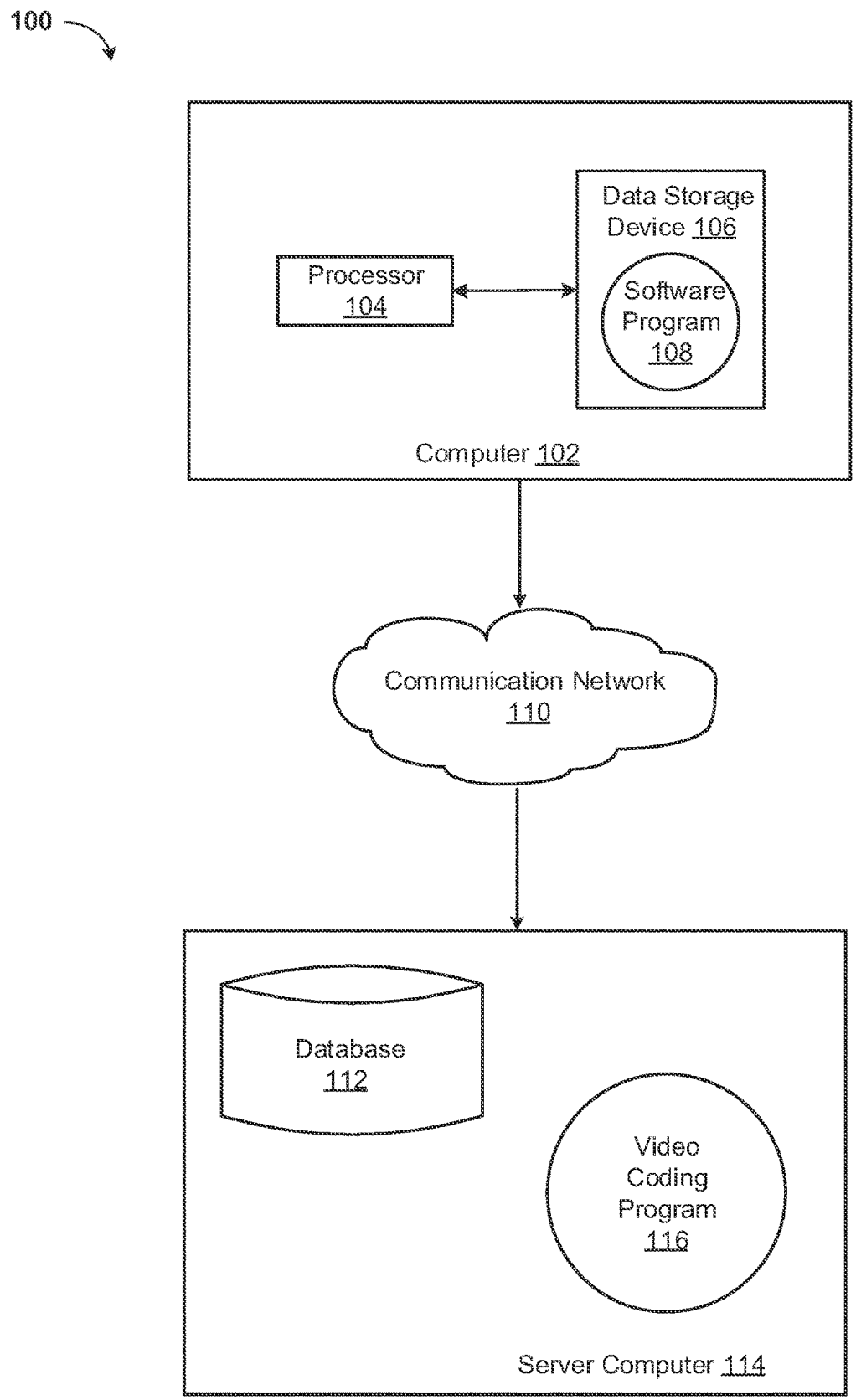
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and decode video data based on predicting block vectors between views of the video data. Therefore, some embodiments have the capacity to improve the field of computing by allowing for improved coding of video data based on intra-frame prediction.

As previously described, the search range of intra block copy mode is constrained to be within the current coding tree unit. The effective memory requirement to store reference samples for intra block copy mode is 1 maximum coding tree unit size of samples. Considering the existing reference sample memory to store reconstructed samples in current 64×64 region, 3 more 64×64 sized reference sample memory are required. Based on this fact, the proposed method extends the effective search range of the intra block copy mode to some part of the left coding tree unit while the total memory requirement for storing reference pixels are kept unchanged (1 coding tree unit size, 4 64×64 reference sample memory in total).

In traditional methods, multiple views of the same scene are stitched into one signal video frame. The stitched video can be coded using a conventional 2-D video codec, such as AVC, HEVC, etc. However, in such an approach, coding of the oversized pictures requires a very large computational complexity increase. Typically, for intra block copy mode, the best matching block for the current coding block will be around the current block in the same picture. For some unique content (such as contents with repeated patterns), the best matching block can be found further away. Similarly, for inter motion estimation, a general assumption is that the object moves from a reference picture to a current picture smoothly with continuous motion. Therefore, the best matching block in a reference picture would appear around a projected center, which can be with similar coordinates as the current block in the current picture. It may be advantageous, therefore, to utilize the similarities among the stitched views inside the same picture to improve the coding efficiency and speed. In this way, intra block copy mode may be used to efficiently find the best matching blocks in the context of multi-view video coding.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a video coding system 100 (hereinafter "system") for coding video data based on predicting block vectors between multiple views within the video data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for coding video data is enabled to run a Video Coding Program 116 (hereinafter "program") that may interact with a database 112. The Video Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116.

It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
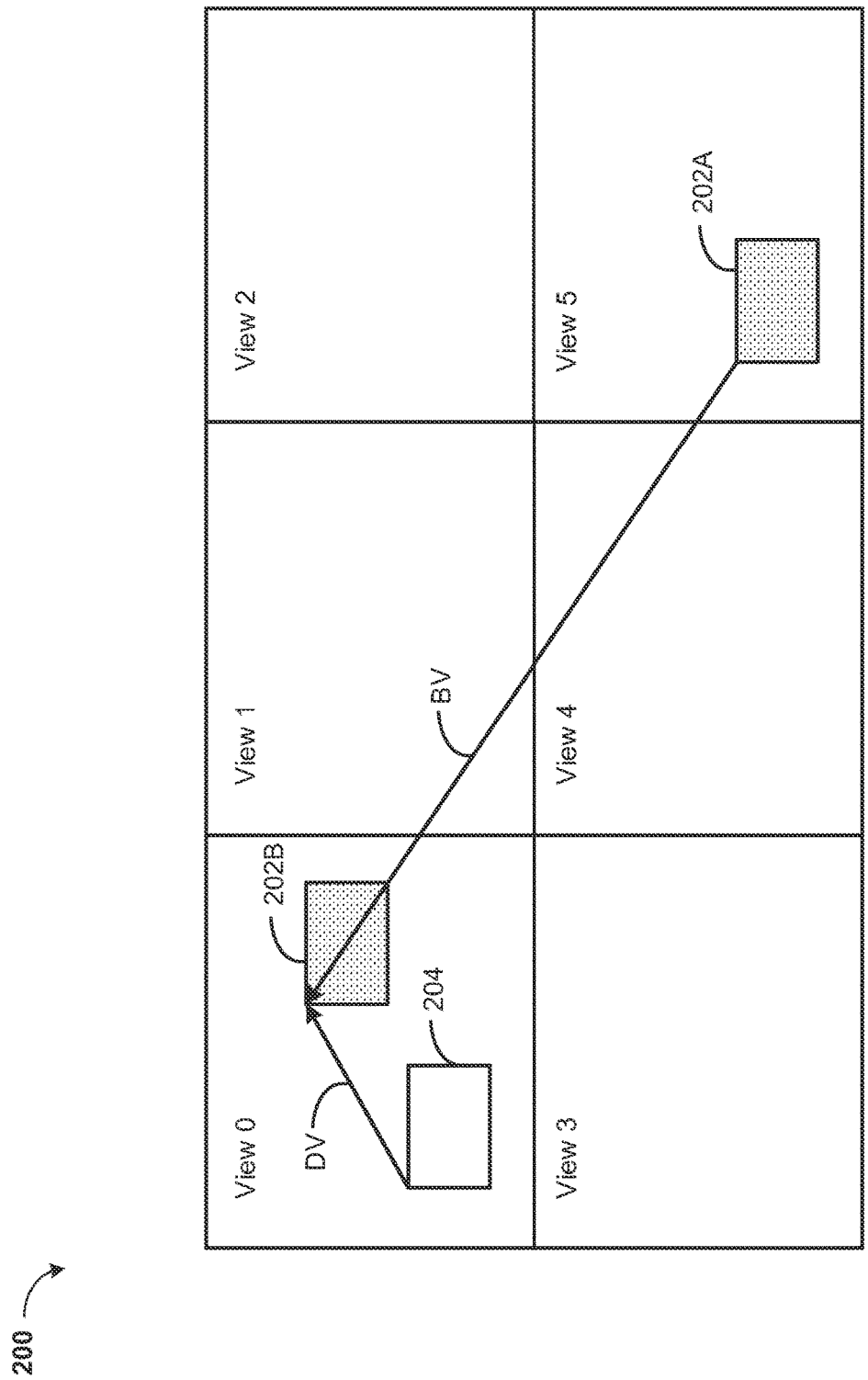
FIG. 2 is a diagram of stitched video data having multiple views, according to at least one embodiment.

Referring now to FIG. 2, an exemplary a diagram of stitched video data 200 having multiple views is depicted. The stitched video data 200 may include several views (View 0 through View 5) spatially stitched together to form a two-dimensional image. By way of example, and not of limitation, six views are depicted in FIG. 2. However, it may be appreciated that any number of views may be stitched together. It may be further appreciated that there may be several ways to spatially stitch the views. For example, for six views, one, two, or three views may be stitched per row, which may yield a 1×6 stitching, a 2×3 stitching, and 3×2 stitching, respectively. For a multi-view video, the views may be stitched with a raster scanning order, either horizontally, or vertically, a zigzag scanning order, or with other scanning orders, such as a snake scanning order.

The stitching may be designed such that the resulting super-sized picture may have a desirable picture size. For example, the super-sized picture may be close to a square shape, a 4:3 aspect ratio rectangular shape, a 16:9 aspect ratio rectangular shape, etc. A frame resolution for each view may be W×H, where W and H may be the width and height of the view frame resolution, respectively. In a case where the super-sized picture may be close to a square shape, the factoring pair (L, M) of N, where N=L*M is the number of views, may be searched, such that |W*L−H*M| may be minimized. The minimizer may be denoted as ($L_0$, $M_0$), and $L_0$ views may be stitched per row. This may yield a $L_0$*$M_0$ stitching, with the super-sized picture size of width W*$L_0$ and height H*$M_0$.

After spatially stitching, intra block copy may be used to explore a correlation between views in the same picture. To speed up block matching in intra block copy mode, the intra block copy search range may be limited to previous coded views in the same. The intra block copy search may be disabled when coding the first view in a picture. The block vector may point to a reference block in previous coded views.

Prior to block matching, a perspective transform may be estimated between two views (e.g., View 0 and View 5). The perspective transform may set up a bijective mapping between the two views. The perspective transform may be applied to the reference view (i.e., View 0), which maps coordinates from the reference view to the current view under coding (i.e., View 5). The "transformed" reference view may be used as reference for conducting block matching.

For a block (e.g., block 202A) in the current view, the block's co-located block (e.g., block 204) may be found in the same position in the "transformed" reference view, and starts with the co-located block as a starting point for block matching (e.g., with block 202B). As the perspective transform approximates closely the transition between two views, the block matching may be limited to a small neighborhood of the co-located block in the "transformed" reference view. In another embodiment, the current block and its co-located block have the same location offset relative to the top-left position of their corresponding views.

The perspective transform may be estimated by analyzing the reference view and the current view. Techniques from computational photography, such as key point detection and matching, may be used to derive it. Alternatively, the perspective transform may be calculated directly from camera parameters and depth map. When depth map and camera parameters are available, a forward projection may be applied to project the depth map of the reference view to coordinates of the current view. The depth map of the current view may be located in the projected depth map of the reference view. A backward projection may be applied to derive the color information for each pixel in the current view from the color information of the reference view. This may create a projected reference view, which will be used for block matching.

One can use a disparity vector DV(Dx, Dy) to indicate the disparity between the co-located block in the reference view and the reference block in the reference view, assuming samples in the block share the same disparity. The disparity vector may be derived in the above discussed methods. Note that for each view pair, the block vector may be different for blocks in different locations of a view. The block vector pointing from the current block to its reference block in a reference view consists of two parts: the view location offset plus the disparity vector. The equation for a current block (with coordinates (Xcurr, Ycurr)) to find its co-located block (with coordinates (Xcol, Ycol)) in a reference view (assuming the reference view is to the top and left side of the current view) may be given as:

$$X\text{col}=X\text{curr}-N^*\text{view\_width}+Dx \quad \text{(Eq. 1)}$$

$$Y\text{col}=Y\text{curr}-M^*\text{view\_height}+Dy \quad \text{(Eq. 2)}$$

where M and N may be numbers of views between the current view and the reference view in the super-sized picture, in X and Y directions respectively; view_width and view_height may be the size of each view.

A block vector predictor may be used to improve block vector difference coding. Similar to above, the co-located block's coordinates (Xcol, Ycol) may be derived. A block vector predictor may be given as:

$$BVP=(X\text{col},Y\text{col})-(X\text{curr},Y\text{curr}). \quad \text{(Eq. 3)}$$

After the encoder finds the real block vector BV for coding, the difference BVD=BV−BVP may be coded. Note that such a block vector predictor may be used as one of the possible block vector prediction candidates. At the decoder side, the block vector predictor from above may be selected as BVP. The block vector predictor may be decoded and added to the block vector difference BVD to form the block vector for the current block.

In one or more embodiments, a derived block vector predictor candidate BVP may be added to a merge candidate list for intra block copy merge or skip mode. In one example, it may be placed after the spatial neighboring candidates.

In one or more embodiments, there may be multiple of such derived block vector predictor candidates available, such as several block vector predictor candidates from different views. The block vector predictor candidates may be added to a merge candidate list for intra block copy merge or skip mode together. In one example, the block vector predictor candidates may be placed in the list where candidates of a closer view (to the current view) may be placed prior to candidates of a further view.

In one or more embodiments, the derived block vector predictor candidate may be added to a block vector predictor candidate list for the block vector coding mode. In one example, it may be added after the spatial neighboring candidates.

In one or more embodiments, the encoder may perform block vector estimation using the derived reference location indicated by block vector predictor as a starting point (or search center) and continue to search around this location in a similar manner as traditional methods where more computational resources (more search points) may be spent on locations near the center and less computational resources (less search points) for further locations.

In one or more embodiments, the encoder may perform block vector estimation using the derived reference location indicated by block vector predictor as one of the probable best matching locations. If the matching result from this location returns with a sufficiently low cost, the block vector estimation process may be terminated early without further checking inside the search window or checking more candidates.

In one or more embodiments, the encoder performs tile based encoding for views. Each view may be encoded as a tile and may be decoded as a tile. The method may include receiving video data including a reference tile and a current tile is received. A co-located block in the reference tile is identified for a current block in the current tile. A predicted block vector is calculated based on an offset vector between the current block and the co-located block, and a disparity vector between the co-located block and the reference block in the reference tile. The video data is encoded/decoded based on the calculated predicted block vector.

In one or more embodiments, the encoder performs candidate block vector index signaling, such as the motion vector index signaling in HEVC.

In one or more embodiments, the encoder performs an ordered search among block vector candidates, wherein the list of candidate vectors, when more than one is added, are ranked based on a proximity between the current view and views corresponding to the candidate vectors, or based on the ranking of qualities in the reference views.

Figure 3:
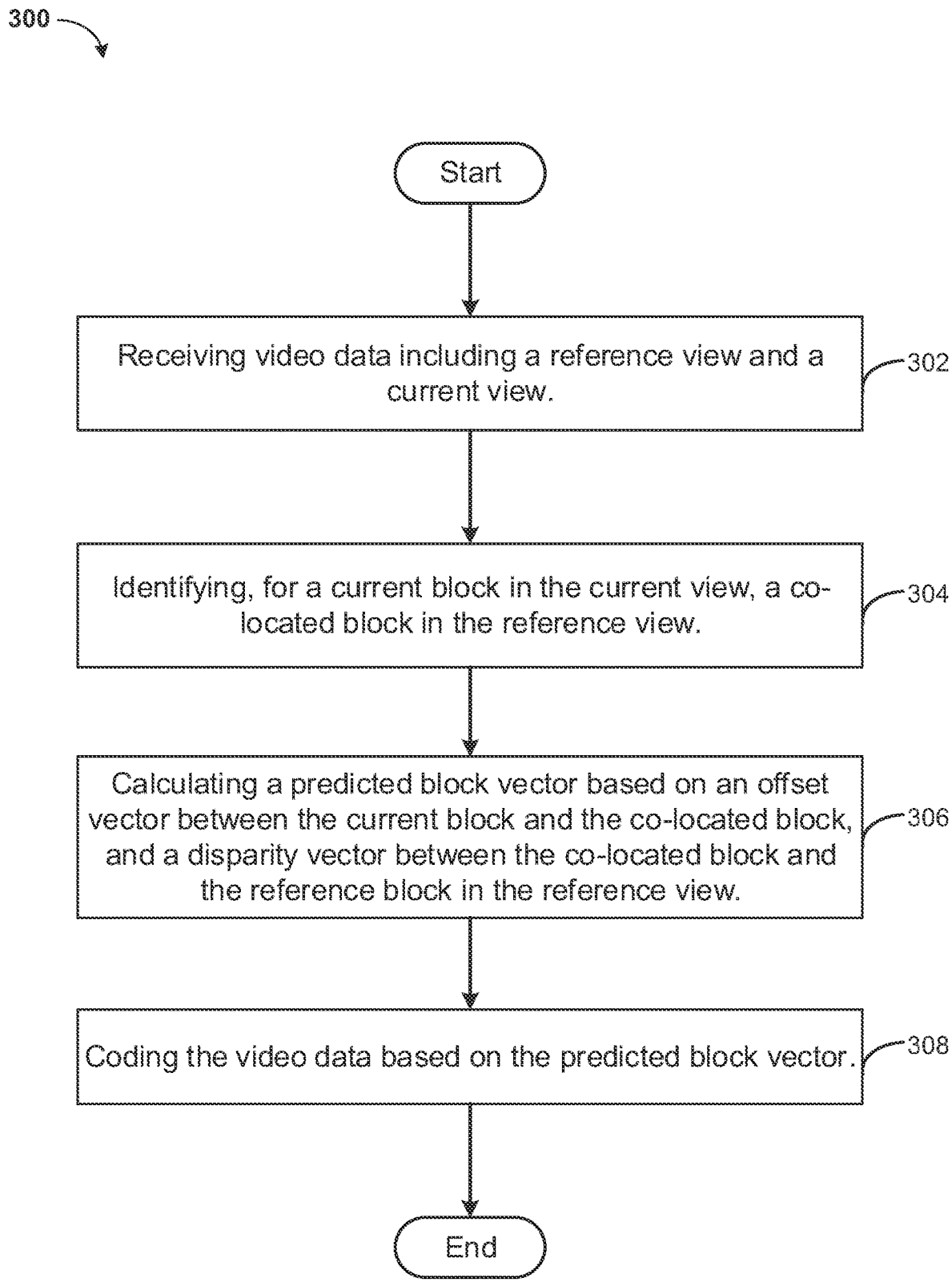
FIG. 3 is an operational flowchart illustrating the steps carried out by a program that codes video data, according to at least one embodiment.

Referring now to FIG. 3, an operational flowchart illustrating the steps of a method 300 for coding video data is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes receiving video data including a reference view and a current view.

At 304, the method 300 includes identifying a co-located block in the reference view for a current block in the current view.

At 306, the method 300 includes calculating a predicted block vector based on an offset vector between the current block and the co-located block, and a disparity vector between the co-located block and the reference block in the reference view. The video data is encoded/decoded based on the calculated predicted block vector.

At 308, the method 300 includes encoding/decoding the video data based on the predicted block vector.

It may be appreciated that FIG. 3 provides only an illustration of one implementation and does not imply any limitations with regard to how different embodiments may be implemented. Many modifications to the depicted environments may be made based on design and implementation requirements.

Figure 4:
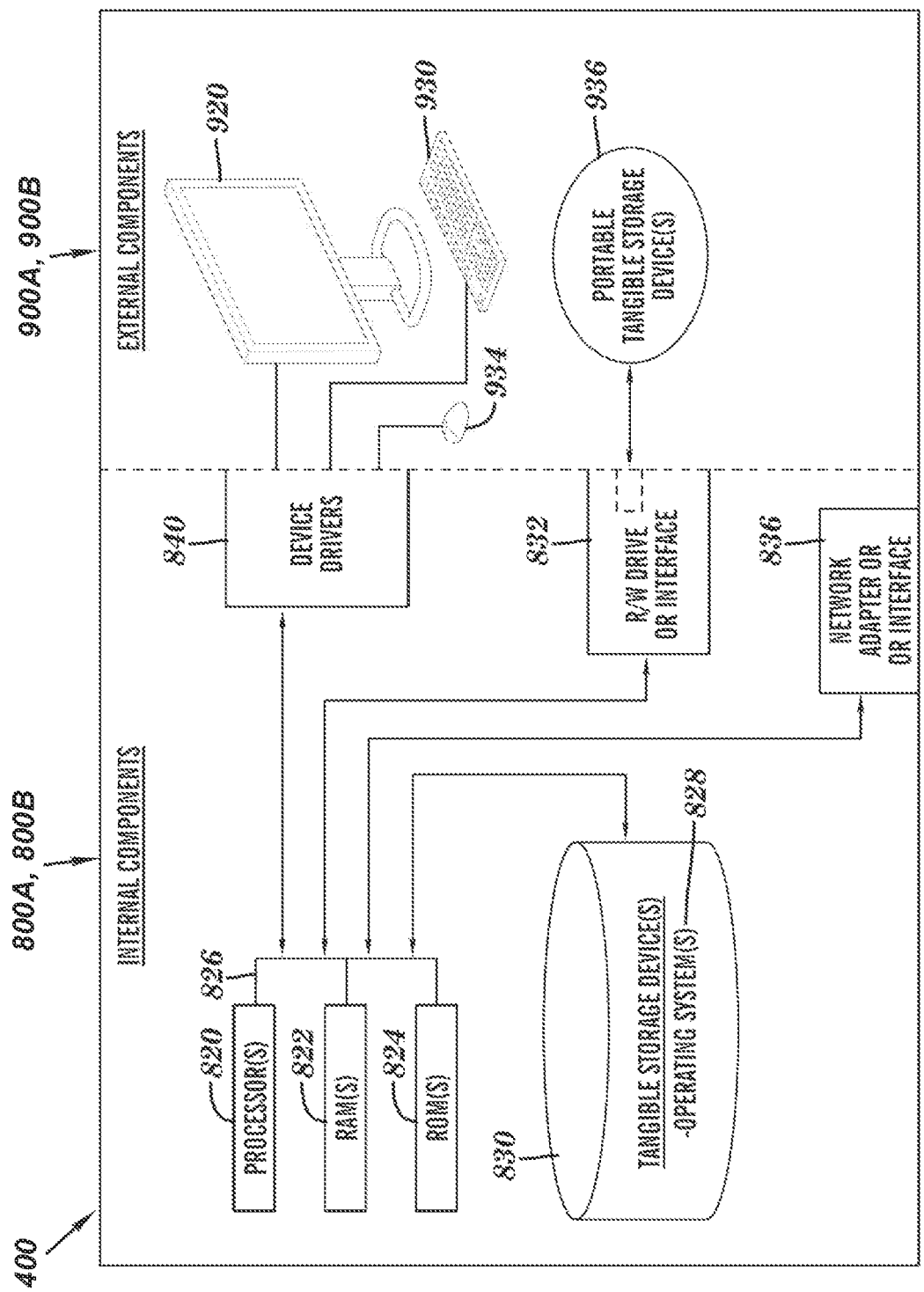
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
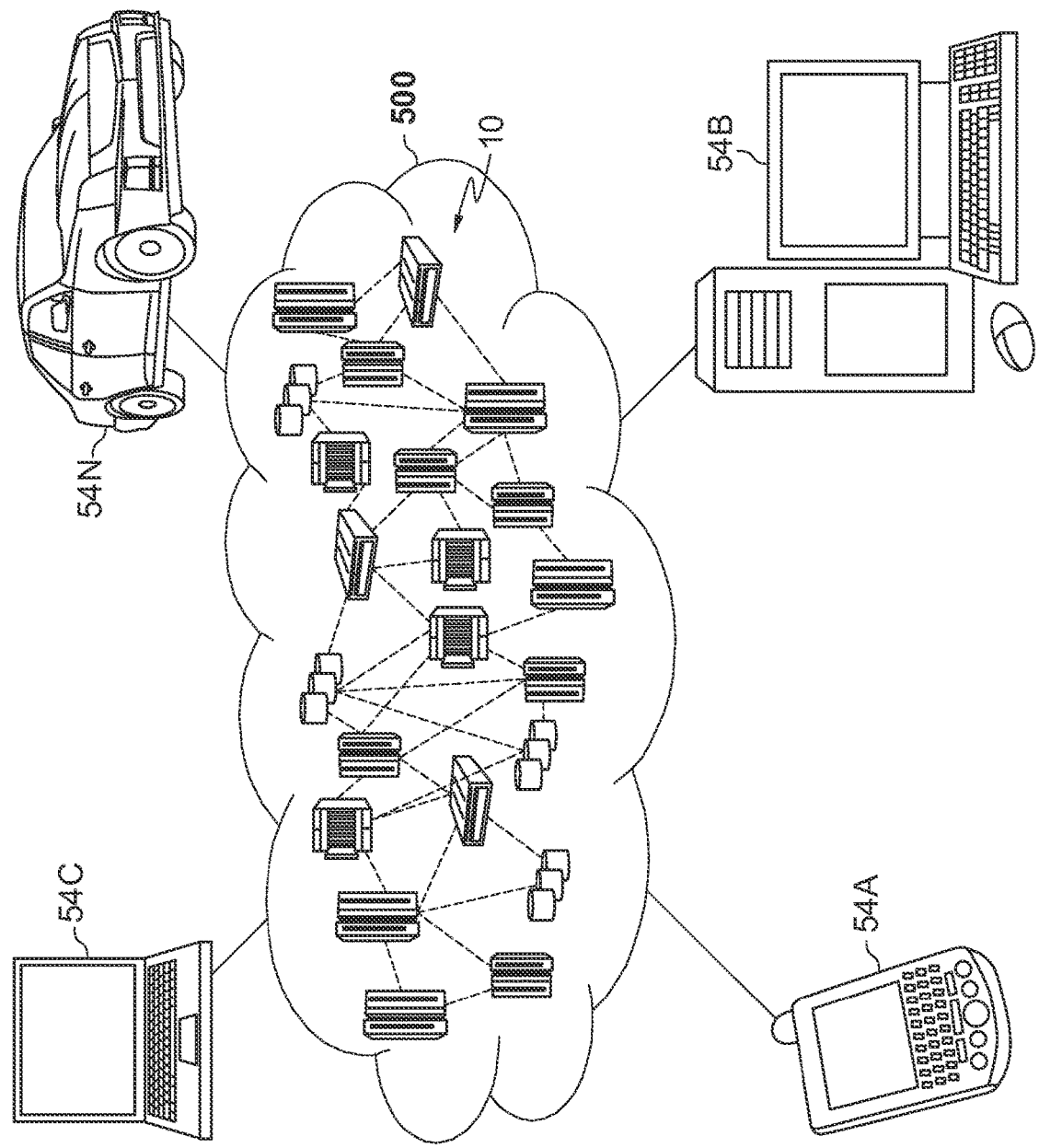
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
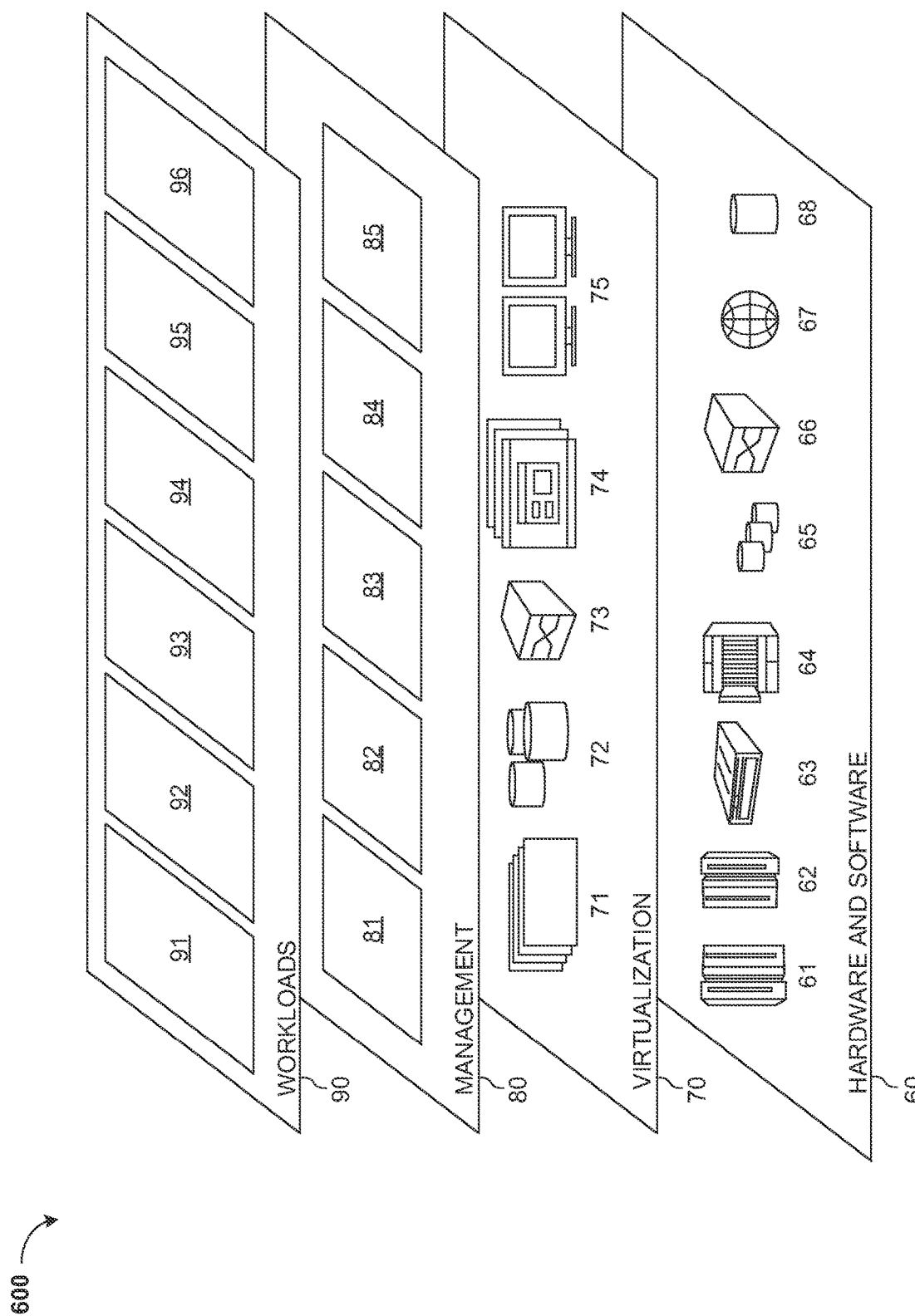
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may encode/decode video data based on predicting block vectors between multiple views within the video data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video decoding, executable by a processor, the method comprising:

receiving a video bitstream of multi-view video data and comprising a reference data block of a reference view of the multi-view video data and a compressed data block of a current view, different than the reference view, of the multi-view video data, wherein the compressed data block of the current view is to be decoded based on the reference data block of the reference view;

identifying, for the compressed data block of the current view of the multi-view video data, the reference data block of the reference view as a co-located block of the reference view of the multi-view video data;

obtaining a predicted block vector based on an offset vector and a disparity vector both of which being between the compressed data block of the current view and the co-located block of the reference view, wherein the predicted block vector is added to a list of candidate vectors for an intra block copy merge mode or an intra skip mode, and wherein the list of candidate vectors are ranked based on a proximity between the current view and views, including the reference view of the multi-view video data, corresponding to the candidate vectors; and decoding the compressed data block of the current view based on the calculated predicted block vector.

2. The method of claim 1, wherein the compressed data block of the current view is decoded based on determining a location of a reference block in the reference view by applying the calculated predicted block vector to the current block in the current view.

3. The method of claim 2, wherein a location of the co-located block and the location of the reference block are used in block vector estimation as one or more probable matching locations.

4. The method of claim 1, wherein a list of candidate vectors for a block vector coding mode comprises the predicted block vector.

5. The method of claim 4, wherein the list of candidate vectors are further ranked based on qualities in the reference views.

6. The method of claim 1, wherein an endpoint of the predicted block vector is used as a search center in block vector estimation.

7. The method of claim 1, wherein the disparity vector is derived based on a relation between the current view and the reference view indicated as:

$$Xcol=Xcurr-N*view\_width+Dx, and$$

$$Ycol=Ycurr-M*view\_height+Dy, where$$

Xcurr and Ycurr indicate coordinates in the current view,
Xcol and Ycol indicate coordinates in the reference view,
N and M indicate one or more numbers of views of the multi-view video data,
view_width and view_height indicate a size of at least one of the views of the multi-view video data, and
Dx and Dy are components of the disparity vector.

8. A computer system for decoding video data, the computer system comprising:

one or more computer-readable non-transitory storage media configured to store computer program code; and one or more computer processors configured to access said computer program code and operate as instructed by said computer program code, said computer program code including:

receiving code configured to cause the one or more computer processors to receive a video bitstream of multi-view video data and comprising a reference data block of a reference view of the multi-view video data and a compressed data block of a current view, different than the reference view, of the multi-view video data, wherein the compressed data block of the current view is to be decoded based on the reference data block of the reference view;

identifying code configured to cause the one or more computer processors to identify, for the compressed data block of the current view of the multi-view video data, the reference data block of the reference view as a co-located block of the reference view of the multi-view video data;

obtaining code configured to cause the one or more computer processors to obtain a predicted block vector based on an offset vector and a disparity vector both of which being between the compressed data block of the current view and the co-located block of the reference view, wherein the predicted block vector is added to a list of candidate vectors for an intra block copy merge mode or an intra skip mode, and wherein the list of candidate vectors are ranked based on a proximity between the current view and views, including the reference view of the multi-view video data, corresponding to the candidate vectors; and decoding code configured to cause the one or more computer processors to decode the compressed data block of the current view based on the calculated predicted block vector.

9. The computer system of claim 8, wherein the compressed data block of the current view is decoded based on determining a location of a reference block in the reference view by applying the calculated predicted block vector to the current block in the current view.

10. The computer system of claim 8, wherein a location of the co-located block and the location of the reference block are used in block vector estimation as one or more probable matching locations.

11. The computer system of claim 8, wherein the list of candidate vectors for a block vector coding mode comprises the predicted block vector.

12. The computer system of claim 11, wherein the list of candidate vectors are further ranked based on qualities in the reference views.

13. The computer system of claim 8, wherein an of the predicted block vector is used as a search center in block vector estimation.

14. The computer system of claim 8, wherein the disparity vector is derived based on a relation between the current view and the reference view indicated as:

$$Xcol=Xcurr-N*view\_width+Dx, and$$

$$Ycol=Ycurr-M*view\_height+Dy, where$$

Xcurr and Ycurr indicate coordinates in the current view,
Xcol and Ycol indicate coordinates in the reference view,
N and M indicate one or more numbers of views of the multi-view video data,
view_width and view_height indicate a size of at least one of the views of the multi-view video data, and
Dx and Dy are components of the disparity vector.

15. A non-transitory computer readable medium having stored thereon a computer program for coding video data, the computer program configured to cause one or more computer processors to:

receive a video bitstream of multi-view video data and comprising a reference data block of a reference view of the multi-view video data and a compressed data block of a current view, different than the reference view, of the multi-view video data, wherein the compressed data block of the current view is to be decoded based on the reference data block of the reference view;

identify, for the compressed data block of the current view of the multi-view video data, the reference data block of the reference view as a co-located block of the reference view of the multi-view video data;

obtaining a predicted block vector based on an offset vector and a disparity vector both of which being between the compressed data block of the current view and the co-located block of the reference view, wherein the predicted block vector is added to a list of candidate vectors for an intra block copy merge mode or an intra skip mode, and wherein the list of candidate vectors are ranked based on a proximity between the current view and views, including the reference view of the multi-view video data, corresponding to the candidate vectors; and decode the compressed data block of the current view based on the calculated predicted block vector.

16. The computer readable medium of claim 15, wherein the compressed data block of the current view is decoded based on determining a location of a reference block in the reference view by applying the calculated predicted block vector to the current block in the current view.

17. The computer readable medium of claim 16, wherein a location of the co-located block and the location of reference block are used in block vector estimation as one or more probable matching locations.

18. The computer readable medium of claim 15, wherein a list of candidate vectors for block vector coding mode comprises the predicted block vector.

19. The computer readable medium of claim 18, wherein the list of candidate vectors are further ranked based on qualities in the reference views.

20. The computer readable medium of claim 15, wherein an endpoint of the predicted block vector is used as a search center in block vector estimation.

* * * * *